F. J. LESLIE.
DEVICE FOR REMOVING OBSTRUCTIONS FROM TUBES.
APPLICATION FILED MAR. 30, 1917.

1,275,571.

Patented Aug. 13, 1918.

INVENTOR
Franklin J. Leslie
By Arthur Phelps Marr
ATTORNEY

UNITED STATES PATENT OFFICE.

FRANKLIN JULIAN LESLIE, OF NEW YORK, N. Y.

DEVICE FOR REMOVING OBSTRUCTIONS FROM TUBES.

1,275,571.　　　　　Specification of Letters Patent.　　Patented Aug. 13, 1918.

Application filed March 30, 1917. Serial No. 158,773.

*To all whom it may concern:*

Be it known that I, FRANKLIN JULIAN LESLIE, a citizen of the United States, and resident of the borough of Manhattan, city, county, and State of New York, have invented certain new and useful Improvements in Devices for Removing Obstructions from Tubes, of which the following is a specification.

From the title of this invention its nature would hardly be appreciated. In using the term "obstruction" I refer to wood chips, cement, plugs, nails or other material so apt to become lodged in tubes and particularly in the conduits or pipes placed in the walls of a building while the building is undergoing construction.

It is well-known that it is customary to place many pipes and particularly electric conduit in position before the cementing or plastering is completed or during the time that such work is being accomplished.

It has not been found practical to cap or cover the ends of such tubes or pipes and although some times wooden plugs or plugs of waste rags or other material are placed in the exposed ends of the pipes or tubes, through carelessness, bad judgment or intent such plugs are often forced into the tube to such an extent that when the tubes are finally sealed into position by the completion of the walls the tube is practically useless unless much care and much labor is employed in extracting such obstructions.

My device has for its purpose the removal of all obstructions from tubes, pipes or conduits and it operates upon the principle of compression and although the device accomplishes a desirable purpose in a very desirable manner it is in itself simple in operation and construction.

In the specification which follows the construction and operation of my device will be fully set forth.

The following is what I consider a good means of carrying out my invention and the accompanying drawing should be referred to for a complete understanding of the specification which follows.

In the drawing:—

Similar reference numerals indicate like parts in all of the figures where they appear.

Figure 1:
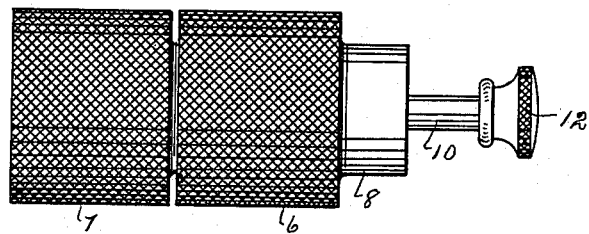
Figure 1 shows in side elevation my completed device.

The tubes or conduits with which my device is intended to operate are usually provided with screw threads on the exposed end, to which extensions of tubing or conduit or fittings are to be attached and it is upon such screw threaded pipe ends that my device is adapted to be secured.

At 1 I show a fitting which may be a casting, cylindrical in plan and having its exterior roughened or knurled.

The fitting 1, has screw threads 2 on the interior of one end and the other opposite end 3 is reduced and provided with screw threads 4 through the reduced portion, and communicating with the screw threaded aperture 2 is a smaller perforation or bore 5, for a purpose that shall appear later.

In general appearance the member 6 is similar to the member 1, it is also provided with screw threads 7, adapted to engage upon the screw threads 4, on the reduced portion 3 of the member 1 and the member 6 is also provided with a reduced portion 8 having a longitudinal passage 9.

Figure 3:
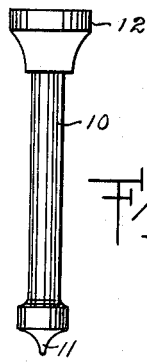
Fig. 3 shows in elevation a firing pin.

In the passage 9, I place what I may term a firing pin 10, this pin is provided with a firing point 11, best shown in Fig. 3 and the outer end of the pin carries the hammer plate or knob 12, which may be screw threaded upon the pin 10 as shown at 13.

The pin 10 is free to be moved in the member 6 and may therefore fit loosely in the aperture or perforation 9. I desire that the pin 10 should move freely in the passage 9, as during operation it is esesential that the pin be pushed backward with so little necessary pressure that there will be no fear of effective operation until a time desired.

In operating my device the members 1 and 6 are separated from each other the member 6 carrying the pin 10.

Figure 4:
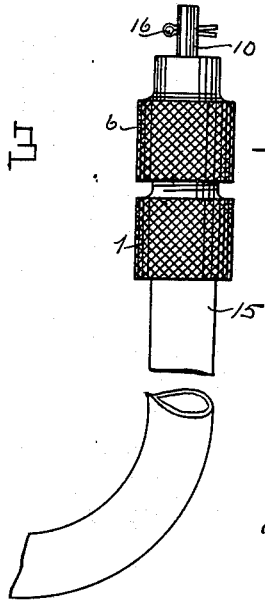
Fig. 4 shows a device in operative position.

The member 1 is then screw threaded upon the conduit or pipe 15 as shown in Fig. 4. A blank cartridge, which may be a revolver or rifle cartridge and which is indicated at 14, is placed in the passage or perforation 5 with its flanged end resting on the face of the reduced portion 3.

Figure 2:
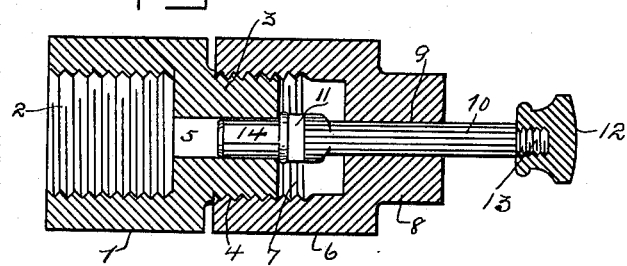
Fig. 2 is a sectional view, certain parts being shown in elevation.

When the cartridge is in the position shown in Fig. 2 the member 6 is screw threaded upon the reduced portion 3 of the member 1 and although it is desirable that the members 1 and 6 be firmly engaged together it will not be necessary to apply a wrench or other tool to secure this engagement.

The member 6 being in position, the firing point 11 of the pin 10 will rest loosely upon the cartridge and then a blow of a hammer upon the plate or knob 12 will explode the cartridge.

The explosion of the cartridge will cause a pressure within the conduit or pipe 15 of sufficient force to drive out any foreign matter or obstruction that might be contained therein. If however a single cartridge does not accomplish the purpose a second or third or even more may be used but it will usually be found that one cartridge will be sufficient.

In Fig. 4 I show that the hammer plate or knob may be omitted and that other means such as the split pin 16 may be employed for retaining the pin 10 in the member 6.

I show the surfaces of the members 1 and 6 knurled but this may be dispensed with and other modifications, such as change of size or general features of construction, may be made within the scope of the appended claims without departing from the principle or sacrificing the advantages of the invention.

Having carefully and fully described my invention what I claim and desire to secure by Letters Patent is:

1. A device of the character described comprising a cylindrical member, a reduced portion formed integral therewith, a second cylindrical member, a reduced portion formed integral therewith, means for securing said members in alinement, a passage in one said member to receive a cartridge and a pin operable through the other said member for discharging said cartridge.

2. A device of the character described comprising a cylindrical member having a screw threaded interior and a knurled exterior, a reduced portion formed integral therewith and having screw threads upon its exterior, a second cylindrical member having interior screw threads adapted to engage the screw threads of said first mentioned member, and a reduced portion formed integral therewith, a longitudinal pin operable in said second member, said first member being provided with means for supporting a cartridge in line with the pin in said second member for the purpose set forth.

3. A device of the character described comprising a generally cylindrical member having screw threads upon its interior and a reduced portion formed integral therewith and having a perforation therethrough for the reception of a cartridge, a second cylindrical member of a size and shape similar to said first member and adapted to be secured to the reduced portion of said first member, said second member having a reduced portion and a perforation therethrough and a pin in the perforation of said second member and having a firing point in line with the perforation of said first member all combined for joint operation as herein specified.

4. A plurality of cylindrical members each provided with an enlarged screw threaded perforation extending partly through said member, a reduced portion having a smaller perforation communicating with said larger perforation, a cartridge supported in one said smaller perforation and a pin arranged in the other said smaller perforation and movable therein, the inner end of said pin being provided with an enlargement having a firing point and the outer end having a hammer plate all combined for joint operation as herein specified and for the purpose set forth.

Signed at Cleveland, county of Cuyahoga, State of Ohio, this 9th day of Mar., 1917.

FRANKLIN JULIAN LESLIE.

Witnesses:
BERNARD MELLEN, Jr.,
H. H. RENZ.